Patented June 17, 1952

2,601,100

UNITED STATES PATENT OFFICE 2,601,100

VAT DYES OF THE ANTHRAQUINONE OXAZOLE AND ANTHRAQUINONE THIAZOLE SERIES WHICH CONTAIN THE AZOBIPHENYL NUCLEUS

Joseph Deinet, Glassboro, N. J., assignor to E. I. du Pont de Nemours and Company, Wilmington, Del., a corporation of Delaware No Drawing. Application May 26, 1950, Serial No. 164,629

7 Claims. (Cl. 260—157)

This invention relates to the preparation of new and valuable vat dyes of the anthraquinone oxazole and anthraquinone thiazole series, and more particularly to new unsymmetrical azobiphenylcarbonylaminoanthraquinone compounds which contain in the molecule an anthraquinone-1,2(N)-oxazole or anthraquinone-1,2(N)-thiazole group. The compounds of this invention have the general formula:

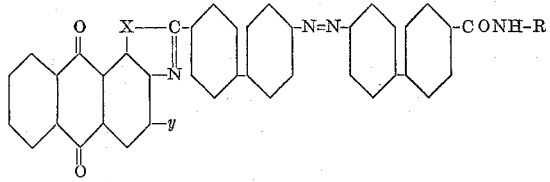

in which X stands for an element of the group consisting of S and O, $y$ stands for a member of the group consisting of hydrogen, chlorine and bromine, and R stands for a vattable anthraquinonyl radical carrying a carboxylic acid group in the ring remote from the carbonylamino linkage, which anthraquinonyl radical is attached to the —CONH— group in either the alpha- or beta- position.

In co-pending applications Serial Nos. 99,873 (now Patent No. 2,559,669 issued July 10, 1951) and 151,806, now Patent No. 2,587,908 issued March 4, 1952 a related group of vat dyes of the anthraquinone oxazole series is disclosed. These compounds dye cotton and related fibers from alkaline hydrosulfite vats in yellow shades which exhibit desirable brightness as well as good fastness properties. It has been found, however, that these dyes are deficient in printing properties, possibly because of poor solubility in the printing gum, for when printed they do not yield the strong and bright yellow shades characteristic of the vat dyeings of these colors.

It is therefore an object of the present invention to produce new and valuable dyes of the anthraquinone vat dye class which will print, as well as dye, cellulose and related fibers in desirable yellow shades and exhibit good brightness, tinctorial strength and fastness properties. It is a more specific object of the invention to produce anthraquinone vat dyes which are 4,4'-substituted azobiphenyl compounds carrying in the molecule both an imino-anthraquinone carboxylic acid and an anthraquinone oxazole or thiazole group.

The colors are best prepared in a non-reactive organic solvent medium by condensing 4,4'-azobiphenyl - 4'',4''' - dicarboxylic acid chloride with a 2-amino-1-halogen anthraquinone or a 2-amino-1-mercaptoanthraquinone and further condensing the intermediate mono-acid chloride so obtained in situ with an aminoanthraquinonecarboxylic acid and then ring-closing the azole ring if it has not ring closed during the condensation reaction, as usually occurs in making the thiazole. Alternatively, the reaction with the amines may be effected in the reverse order, followed by ring closure to the oxazole compound with an acid binding agent and a catalyst at elevated temperatures in the range of from 180° to 220° C. These compounds may also be prepared by condensing a 4''-(1,2(N)-anthraquinoneoxazolyl)-azobiphenyl-4'''-carbonyl chloride with an aminoanthraquinonecarboxylic acid. The products may be conditioned for dyeing or printing in the usual manner, such as by milling or acid pasting with or without further purification by bleaching with sodium hypochlorite.

These new dyes are in general yellow pastes; they dye and print cotton or related fibers in strong bright yellow shades and exhibit good light-fastness and tinctorial strength. Their wet-fastness is of the same high order as found in most anthraquinone vat colors.

The following examples are given to illustrate the invention. The parts used are by weight.

Example 1

Twelve hundred (1200) parts of nitrobenzene, 2 parts of pyridine, 60 parts of 4,4'-azobiphenyl-4'',4'''-dicarboxylic acid (sodium salt) and 50 parts of thionyl chloride are heated together, while agitating, to from 98° to 100° C. and maintained at that temperature for from 12 to 20 hours. The mass is then air blown for one-half hour to remove excess of thionyl chloride. After cooling to 40° C., there are added 33 parts of 1-chloro-2-aminoanthraquinone. The mass is then heated to 140° C. and maintained at this temperature for 6 hours. After cooling to 25° C., there are added 34.8 parts of a normally occurring mixture of 1-aminoanthraquinone-6 (and 7)-carboxylic acid (prepared by nitration of 2-AQ-COOH followed by reduction by sodium sulfide, giving a mixture of the two isomers). The reaction mass is then heated to 203°–205° C. and maintained at that temperature for 3 hours. The mass is cooled to 25° C. and 50 parts of sodium carbonate, 50 parts of potassium acetate, 1.5 parts of cupric acetate and 1.5 parts of cuprous chloride are added. This mass is heated to from 208° to 210° C. and maintained for 4 hours. It is then cooled, filtered, the filtered cake washed with nitrobenzene, alcohol and hot water in turn, and dried. The product, which is a mixture of the 6- and 7-carboxylic acid derivatives, is acid pasted by drowning a concentrated sulfuric acid solution of the color in water, thereafter filtering and water-washing. The dye cake is purified by suspending it in water and bleaching with sodium hypochlorite. It forms a bright yellow paste and dyes and prints cotton or related fibers in strong bright yellow shades of excellent fastness properties.

Example 2

Nine hundred (900) parts of nitrobenzene, 2 parts of pyridine, 50 parts of 4,4'-azobiphenyl-4'',4'''-dicarboxylic acid and 43 parts of thionyl chloride are heated together at from 98° to 100° C. and maintained for 20 hours. The mass is then air blown for one-half hour to remove excess of thionyl chloride. After cooling to 25° C. there are added 32 parts of 1-aminoanthraquinone-6-carboxylic acid. The mass is then heated to 138° C. and maintained at this temperature for 6 hours, and air blown at this temperature for one-half hour to remove hydrochloric acid. After cooling to 25° C. there are added 33.5 parts of 1 - mercapto - (Na) - 2-aminoanthraquinone. The mass is then slowly heated to 210° C. and maintained at this temperature for 2 hours. It is then cooled to 80° C., filtered and the filter cake washed with nitrobenzene, alcohol and hot water in turn, and dried. The product is then acid pasted and purified by bleaching with sodium hypochlorite. It forms a bright yellow paste and dyes and prints cotton in strong bright yellow shades of excellent fastness properties. The dye has the formula:

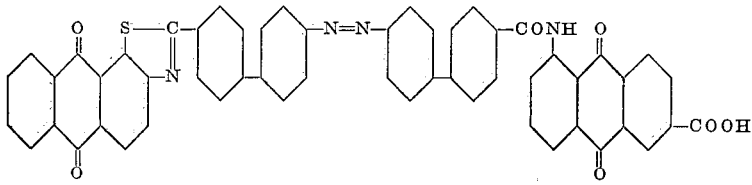

Example 3

Fifty (50) parts of 4,4'-azobiphenyl-4'',4'''-dicarboxylic acid are converted to the acid chloride as in Example 2. 30.5 parts of 1-chloro-2-aminoanthraquinone are added and the mass heated to 138° to 140° C. and maintained at this temperature for 6 hours. The mass is then cooled to 25° C. and 32 parts of a normally occurring mixture of 1-aminoanthraquinone-5(and 8)-carboxylic acid (prepared by nitration of 1–AQ–COOH followed by reduction, giving a mixture of the two isomers) are added. The reaction mass is then heated to 210° C. and maintained for one hour. The mass is then cooled to 50° C. and 50 parts of sodium carbonate, 50 parts of potassium acetate, one part of cupric acetate and one part of cuprous chloride are added. The mass is then heated to 210° C. and maintained for 3 hours. It is then cooled to 50° C. and the mass filtered, the filter cake is washed with nitrobenzene, alcohol and hot water in turn, and dried. The product is then acid pasted with sulfuric acid and purified by suspending in water and bleaching with sodium hypochlorite. It forms a bright yellow paste and dyes and prints cotton in strong bright yellow shades of excellent fastness properties. In this example the isolated 1-aminoanthraquinone-5-carboxylic acid, or its 8-isomer may be employed in place of the normally occurring mixture, to give dyes having similar dyeing and printing properties.

Example 4

Fifty (50) parts of 4,4'-azobiphenyl-4'',4'''-dicarboxylic acid are converted to the acid chloride as in Example 2. 30.5 parts of 1-chloro-2-aminoanthraquinone are added and the mass heated to from 138° to 140° C. and maintained at this temperature for 6 hours. The mass is then cooled to 50° C. and 31.6 parts of 2-aminoanthraquinone-6-carboxylic acid are added. The reaction mass is then heated to 210° C. and maintained at this temperature for one and one-half hours. The mass is then cooled to 100° C. Fifty (50) parts of sodium carbonate, 50 parts of potassium acetate, one part of cupric acetate and one part of cuprous chloride are added. The reaction mass is then heated to 210° C. and maintained at this temperature for 3 hours. It is then cooled to 100° C. and the mass steam-distilled free from nitrobenzene, filtered, and the filter cake washed free from alkali and dried. The product is then acid pasted and purified by bleaching with sodium hypochlorite. It forms a bright yellow paste and dyes and prints cotton in bright yellow shades of good fastness properties. The dye has the formula:

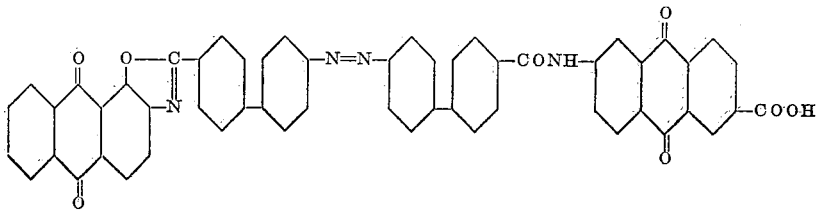

Example 5

Twelve hundred (1200) parts of nitrobenzene, one part of pyridine, 61.5 parts of 4''-(1,2(N)-anthraquinoneoxazolyl) - azobiphenyl - 4''' - carbonyl chloride and 26.7 parts of a mixture of 1-aminoanthraquinone-6(and 7)-carboxylic acid (prepared by nitration of 2-anthraquinonecarboxylic acid followed by reduction, a procedure which gives rise to a mixture of two isomers) are heated while agitating to 210° C. and maintained for one and one-half hours at this temperature. The mass is cooled to 50° C., filtered and the filter cake washed with nitrobenzene and alcohol in turn, and dried. The product is then acid pasted and purified by bleaching with sodium hypochlorite. It forms a bright yellow paste and dyes and prints cotton in bright yellow shades and is identical with Example 1.

*Example 6*

Nine hundred (900) parts of nitrobenzene, 2 parts of pyridine, 49.2 parts of 4,4'-azobiphenyl-4'',4'''-dicarboxylic acid chloride and 26.7 parts of 1-aminoanthraquinone-6-carboxylic acid are heated while agitating to 138° C. and maintained at this temperature for 6 hours. The mass is then cooled to 50° C. and 33.6 parts of 1-bromo-2-amino-3-chloroanthraquinone are added. The mass is then heated to 210° C. and maintained at this temperature for 2 hours. Then the reaction mass is cooled to 100° C. Forty-five (45) parts of soda ash, 45 parts of potassium acetate, one part of cupric acetate and one part of cuprous chloride are added. The mass is then heated to 210° C. and maintained for 3 hours. The mass is then cooled to 50° C., filtered and the filter cake washed with nitrobenzene, alcohol and hot water, in turn, and dried. The product is then acid pasted and purified by bleaching with sodium hypochlorite. It forms a bright yellow paste and dyes and prints cotton and related fibers in bright yellow shades of excellent fastness properties.

Any of the aminoanthraquinonecarboxylic acids disclosed in the examples may be employed in Example 2 to produce the corresponding thiazole-amide compounds.

Although Examples 1, 3 and 5 disclose a mixture of isomeric carboxylic acids, either isomer in pure form may be used interchangeably in any of the examples. These isomeric amino acids may be readily separated in pure form by fractional precipitation from sulfuric acid or by salting their aqueous solution by procedures well known in the art.

In place of the particular chloroaminoanthraquinones used in the preparation of the oxazoles or the thiazoles of the above examples, there may be substituted equivalent amounts of 1-chloro-2-amino-3-bromoanthraquinone, 1,3-dichloro-2-aminoanthraquinone or the 1,3-dibromo-2-aminoanthraquinone or the 1-mercapto-2-aminoanthraquinones carrying chlorine or bromine in the 3-position to give dyes as more particularly formulated in the introduction of the present specification where y stands for chlorine or bromine.

I claim:

1. The compounds of the formula:

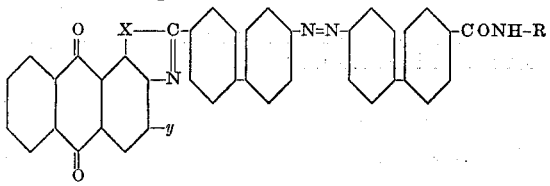

in which X stands for an element of the group consisting of S and O, y stands for a member of the group consisting of hydrogen, chlorine and bromine, and R stands for a vattable anthraquinonyl radical carrying a carboxylic acid group in the ring remote from the carbonylamino linkage.

2. The compound of the formula:

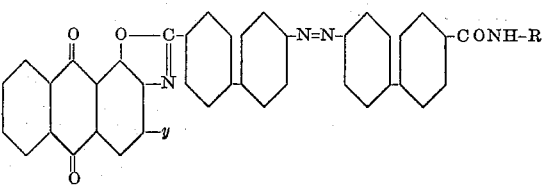

in which y stands for a member of the group consisting of hydrogen, chlorine and bromine and R stands for a vattable anthraquinonyl radical carrying a carboxylic acid group in the ring remote from the carbonylamino linkage.

3. Compounds of the formula:

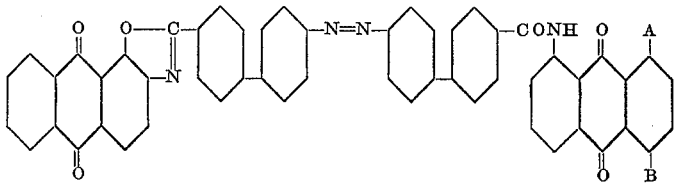

which carry in one of the positions A and B a carboxylic acid group.

4. The compound of the formula:

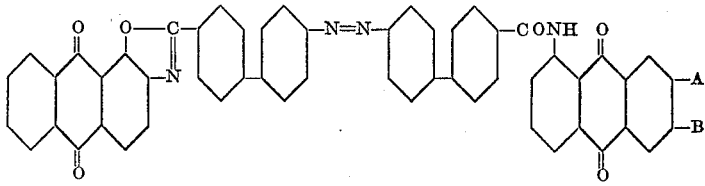

which carry in one of the positions A and B a carboxylic acid group.

5. The compound of the formula:

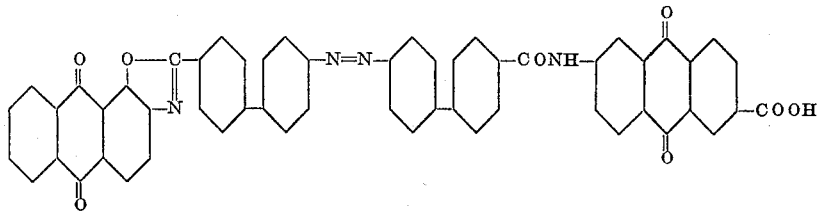

6. A vat dye composition comprising a mixture of isomers of monocarboxylic acid compounds of the formula:

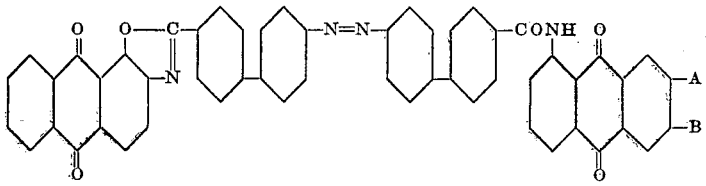

in which the carboxylic acid group of one isomer is in the position A and of the other isomer in the position B.

7. A vat dye composition comprising a mixture of isomers of monocarboxylic acid compounds of the formula:

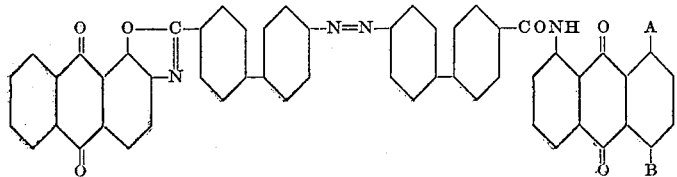

in which the carboxylic acid group of one isomer is in the position A and of the other isomer in the postion B.

JOSEPH DEINET.

REFERENCES CITED

The following references are of record in the file of this patent:

UNITED STATES PATENTS

| Number | Name | Date |
|---|---|---|
| 2,175,803 | Honold et al. | Oct. 10, 1939 |
| 2,228,455 | Honold et al. | Jan. 14, 1941 |

FOREIGN PATENTS

| Number | Country | Date |
|---|---|---|
| 826,768 | France | Aug. 12, 1939 |
| 848,018 | France | July 17, 1939 |